United States Patent [19]

Ishikawa

[11] Patent Number: 5,782,143
[45] Date of Patent: Jul. 21, 1998

[54] FLEXIBLE MESHING TYPE GEAR DEVICE WITH NEGATIVE DEFLECTION PASSING TOOTH PROFILE

[75] Inventor: Shoichi Ishikawa, Nagano-ken, Japan

[73] Assignee: Harmonic Drive Systems, Inc., Tokyo, Japan

[21] Appl. No.: 687,485

[22] PCT Filed: Dec. 19, 1994

[86] PCT No.: PCT/JP94/02141
  § 371 Date: Oct. 3, 1996
  § 102(e) Date: Oct. 3, 1996

[87] PCT Pub. No.: WO96/19683
  PCT Pub. Date: Jun. 27, 1996

[51] Int. Cl.[6] .................... F16H 1/32; F16H 55/08
[52] U.S. Cl. ............................................. 74/640
[58] Field of Search ................................. 74/640, 462

[56] References Cited

U.S. PATENT DOCUMENTS

| | | | |
|---|---|---|---|
| 2,906,143 | 9/1959 | Musser | 74/640 |
| 4,823,638 | 4/1989 | Ishikawa | 74/640 |
| 5,485,766 | 1/1996 | Ishikawa | 74/640 |

FOREIGN PATENT DOCUMENTS

| | | |
|---|---|---|
| 45-41171 | 12/1970 | Japan . |
| 63-115943 | 5/1988 | Japan . |
| 5-172195 | 7/1993 | Japan . |
| 5-172196 | 7/1993 | Japan . |

*Primary Examiner*—Khoi Q. Ta
*Attorney, Agent, or Firm*—Burns, Doane, Swecker & Mathis, LLP

[57] ABSTRACT

The amount of radial flexing (w) in a basic section defined perpendicular to the axis of the flexible external gear (3) at a prescribed point on the tooth trace of the flexible external gear (3) is defined to be an amount of negative deviation flexing smaller than the normal amount of flexing ($W_0$) The rigid internal gear (2) and the flexible external gear (3) are both spur gears and the number of teeth of the flexible external gear (3) is 2n (n being a positive integer) fewer than that of the rigid internal gear (2). The working tooth profile of one of the gears (2, 3) is defined to be a convex curve whose shape is or approximates a convex curve (L2(O.B)) obtained by similarity transformation of a peak portion (L1(O.A)) of the rack-approximated moving path (L1) of a tooth of the gear with respect to the other gear in the basic section of the tooth trace perpendicular to the axis, the portion being convex relative to the other gear, at an enlargement ratio ($\lambda$) using the apex of the moving path as the origin. The working tooth profile of the other gear is defined to be a concave curve whose shape is a concave curve (L3(O.C)) obtained by similarity transformation of the same portion of the moving path at an enlargement ratio ($\lambda$+1) using the apex of the moving path as the origin. The meshing of the two tooth profiles is pass messing enabling continuous contact and the ability to retain a lubricating oil film between the tooth surfaces is enhanced.

14 Claims, 14 Drawing Sheets

FLEXIBLE MESHING TYPE GEAR DEVICE WITH NEGATIVE DEFLECTION PASSING TOOTH PROFILE

TECHNICAL FIELD

This invention relates to a flexible meshing type gear device. More particularly, this invention relates to the tooth profiles of a rigid internal gear and a flexible external gear used in a flexible meshing type gear device.

BACKGROUND ART

A flexible meshing type gear device typically consists of a rigid circular internal gear, a flexible external gear which has, for example, 2n (n being a positive integer) fewer teeth than the internal gear and which is disposed inside the internal gear and flexed into an elliptical shape so as to mesh with the internal gear at two places, and a wave generator fitted inside the external gear for flexing it into an elliptical shape.

Although the basic tooth profile for the gears of a flexible meshing type gear device is linear (see U.S. Pat. No. 2,906,143), flexible meshing type gear devices using involute gears have also been developed (see JP-B 45-411171). In addition, the present inventor proposed a system using as the tooth face profile of both gears the curve obtained by similarity transforming the moving path, at a reduction ratio of ½, over a prescribed range from the meshing limit point on the path based on the rack approximation of the tooth of the external gear relative to the internal gear (JP-A 63-115943). This is a system for obtaining continuous contact between the tooth profiles of the tooth faces of both gears.

One type of flexible meshing type gear device known to the art is fitted with an annular flexible external gear and another type is fitted with a cup-shaped flexible external gear. In the latter type of device, a three-dimensional flexing phenomenon called coning occurs in which the insertion of the elliptical wave generator causes the amount of flexing (difference between the major and minor axes of the ellipse) to gradually increase from the diaphragm side toward the opening portion of the cup-shaped flexible external gear approximately in proportion to the distance from the diaphragm. The tooth profiles described in the aforementioned publications do not take this coning into consideration, however. Therefore, while continuous meshing of the tooth profiles of the two gears can be realized for tooth traces with specific sections (e.g., a non-deviated section corresponding to the normal amount of flexing), tooth interference and other problems arise at other sections of the tooth trace.

The inventor later proposed a flexible meshing type gear device enabling a wider mesh range, without interference, over the entire tooth trace of the cup-shaped flexible external gear. This device is proposed, for example, in Japanese Patent Applications Hei 3-357036 and Hei 3-357037.

The performance being demanded of flexible meshing type gear devices is becoming increasingly sophisticated. To respond to this demand, it is necessary to further improve device strength and wear resistance. There is a particular need to improve the wear resistance of the tooth surface to the maximum possible.

All of the aforementioned inventions enable continuous meshing along the tooth trace. However, the meshing is so-called countermovement meshing. Since it is therefore impossible to avoid disadvantages from the point of maintaining a lubricating oil film between the tooth surfaces, a certain limit on the permissible delivered torque is present owing to tooth surface wear caused by oil film rupture. Because of this, a strong need is felt for an improvement in this respect.

DISCLOSURE OF THE INVENTION

For achieving the aforesaid improvement, this invention replaces the prior-art tooth profile, which conducts countermovement meshing involving continuous contact between convex curves, with fundamentally improved tooth profiles for the rigid internal gear and the flexible external gear. Specifically, a new convex curve tooth profile is adopted as the working tooth profile of either the rigid internal gear or the flexible external gear and a concave curve tooth profile is adopted as the working tooth profile of the other gear. As a result, the two gears perform pass meshing between a convex tooth profile and a concave tooth profile, which is advantageous from the point of lubrication.

More specifically, this invention is characterized in that the following structural features are provided in a flexible meshing type gear device having a rigid internal gear, a flexible external gear inside the internal gear and a wave generator for flexing the section of the external gear perpendicular to its axis into an elliptical shape, causing the flexible external gear to mesh partially with the rigid internal gear and rotating the mesh positions of the two gears in the circumferential direction, the rotation of the wave generator producing relative rotation between the two gears.

(a) The amount of radial flexing (w) in a basic section defined perpendicular to the flexible external gear axis at a prescribed point on the tooth trace of the gear is defined to be an amount of negative deviation flexing smaller than the normal amount of flexing ($W_0$)

(b) The rigid internal gear and the flexible external gear are both spur gears.

(c) The number of teeth of the flexible external gear is 2n (n being a positive integer) fewer than that of the rigid internal gear.

(d) The working tooth profile of either the rigid internal gear or the flexible external gear, designated as the first gear, is defined to be a convex curve whose shape is or approximates a convex curve obtained by similarity transformation of a peak portion of the rack-approximated moving path of a tooth of the gear with respect to the other gear, designated as the second gear, in the basic section of the tooth trace perpendicular to the axis, the portion being convex relative to the other gear, at an enlargement ratio ($\lambda$) using the apex of the moving path as the origin.

(e) The working tooth profile of the other or second gear is defined to be a concave curve whose shape is or approximates a concave curve obtained by similarity transformation of the same portion of the moving path at an enlargement ratio ($\lambda$+1) using the apex of the moving path as the origin, whereby meshing of the two tooth profiles is pass meshing enabling continuous contact in the basic sector perpendicular to the axis.

Preferably, either the peak portion of the concave tooth profile of the second gear whose working tooth profile is a concave curve is formed as a convex curve in proportion to the need to avoid interference or the tooth crest is shortened.

The tooth profiles of this invention can also be applied to a flexible meshing type gear device equipped with a cup-shaped flexible external gear. In order to realize continuous contact along the tooth trace in this case, relieving is preferably applied, in proportion to the need to avoid interference, toward the opening portion of the cup-shaped flexible external gear and toward the inner end on the diaphragm side thereof relative to the basic section of the tooth trace perpendicular to the axis.

The tooth profiles of this invention can also be applied to a flexible meshing type gear device in which the flexible external gear is flexed in trilobate shape to mesh with the rigid internal gear at three points on the periphery thereof. In this case, the number of teeth of the flexible external gear is set to be 3n (n being a positive integer) fewer than the number of teeth of the rigid internal gear.

BEST MODE FOR CARRYING OUT THE INVENTION

Embodiments of the invention will be explained with reference to the drawings in the following.

Figure 1:
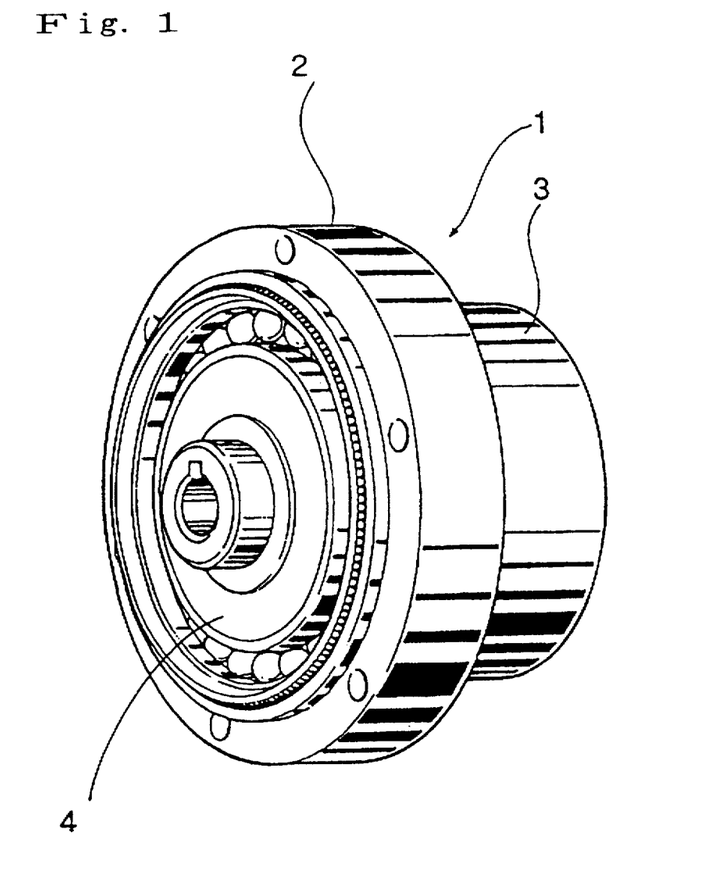
FIG. 1 is a perspective view of a flexible meshing type gear device equipped with a cup-shaped flexible external gear.
Figure 2:
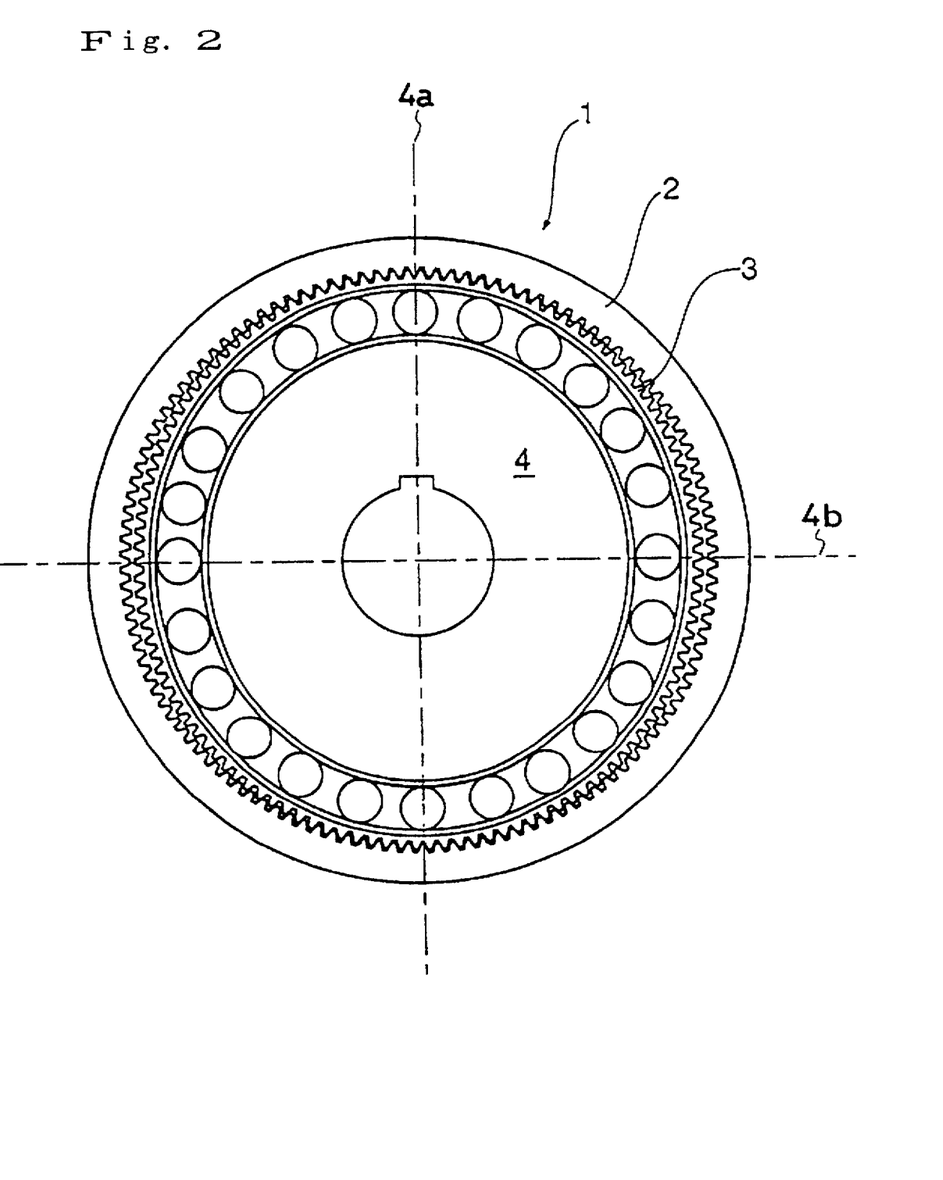
FIG. 2 is a schematic front view of the device of FIG. 1.

FIGS. 1 and 2 are perspective and front views of a prior-art flexible meshing type gear device to which this invention can be applied. This flexible meshing type gear device 1 comprises a cylindrical rigid internal gear 2, a cup-shaped flexible external gear 3 disposed inside the rigid internal gear 2, and an elliptical wave generator 4 fitted inside the cup-shaped flexible external gear 3. The cup-shaped flexible external gear 3 is in a flexed state produced by the wave generator 4. The major axis and minor axis directions of the ellipse of the wave generator 4 are respectively designated by references symbols 4a, 4b in the drawings.

Figure 3A:
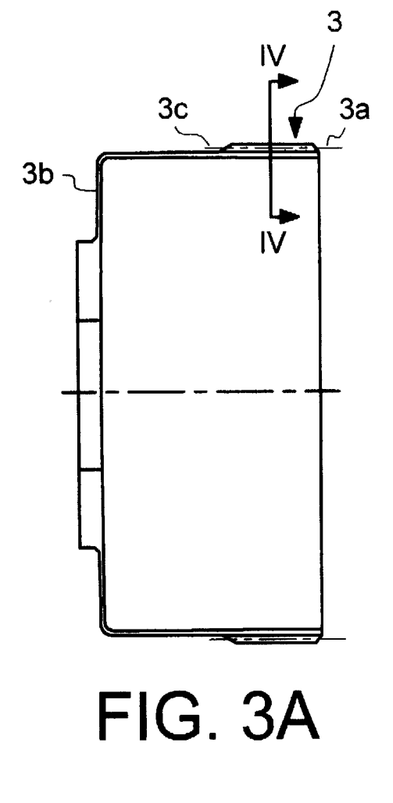
FIG. 3 is a set of diagrams for explaining how the cup-shaped flexible external gear is flexed by coning, in which (a) is a section through the axis before deformation, (b) is a section through the axis including the major axis of the wave generator, and (c) is a section through the axis including the minor axis.
Figure 3B:
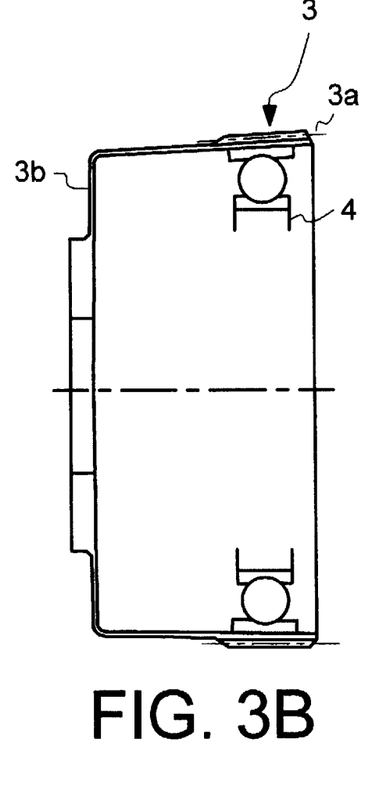
Figure 3C:
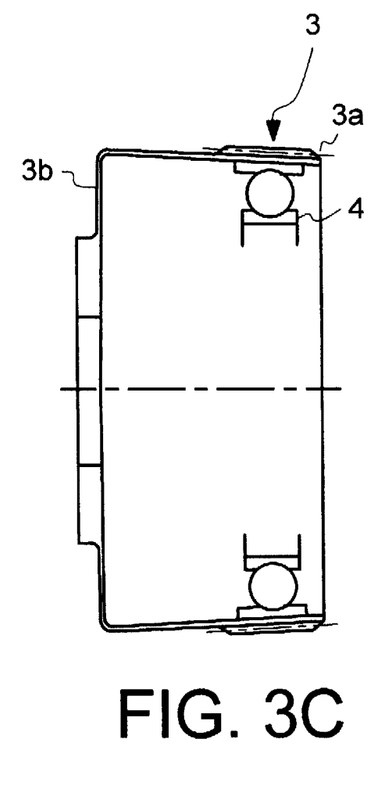

FIG. 3 shows the flexed state in sections through the axis of the cup-shaped flexible external gear 3 caused by so-called coning, namely, by flexing the opening portion of the flexible external gear. FIG. 3(a) shows the state before deformation, (b) is a section through the axis including the major axis 4a of the wave generator 4, and (c) is a section through the axis including the minor axis 4b thereof. As can be seen from these diagrams, the amount of flexing produced in the cup-shaped flexible external gear 3 is maximum at the opening side section 3a and gradually decreases toward the inner end section 3c on the diaphragm 3b side.

Figure 4:
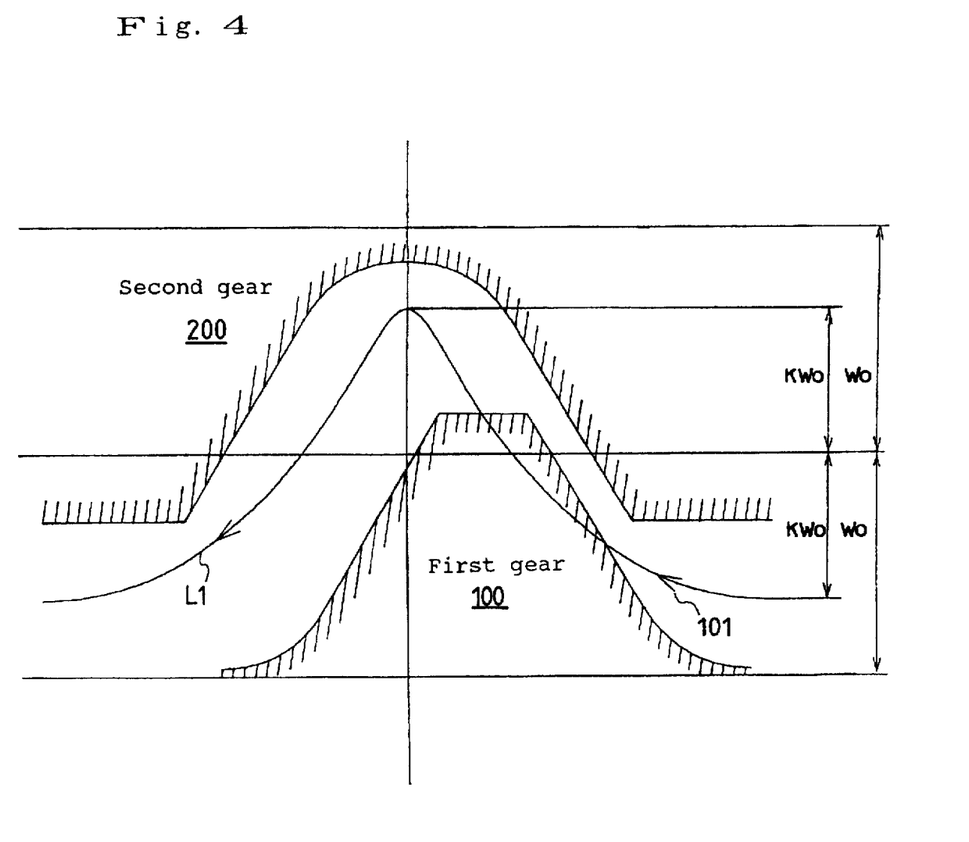
FIG. 4 is the moving path in a basic section perpendicular to the axis, as determined by rack approximation, in the case of negative deviation of a tooth of a flexible external gear or a rigid internal gear with respect to the other gear.

FIG. 4 is the moving path in a basic section perpendicular to the tooth (a section perpendicular to the axis used in tooth profile definition such as the section taken at the center of the tooth trace indicated by IV—IV in FIG. 3(a)) of a tooth of the flexible external gear or the rigid internal gear (hereinafter called the "first gear 100") with respect to the other gear (hereinafter called the "second gear 200"). The moving path L1 shown here is that in the case of so-called negative deviation in which the amount of radial flexing (difference between the pitch circle of the flexible external gear and the maximum radius thereof when the pitch circle is deformed into elliptical or trilobate shape) is smaller than the normal value $W_0$ (value obtained by dividing the pitch circle radius of the flexible external gear by the reduction ratio when the rigid internal gear is fixed), namely, in the case where the amount of radial flexing is $\kappa W_0$, where $\kappa$ is the standard flexing coefficient ($\kappa < 1$). Moreover, the moving path L1 shown in the same figure is that in the case where the flexible external gear is flexed into elliptical shape and the arrow 101 indicates the moving direction of the first gear 100. (Since the flexible meshing type gear device has a large number of teeth, the gear meshing can be approximated as that of a rack with an infinite number of teeth. Gear meshing is therefore treated in terms of rack approximation in the following discussion of tooth profile derivation with respect to this and the other figures.)

Figure 5:
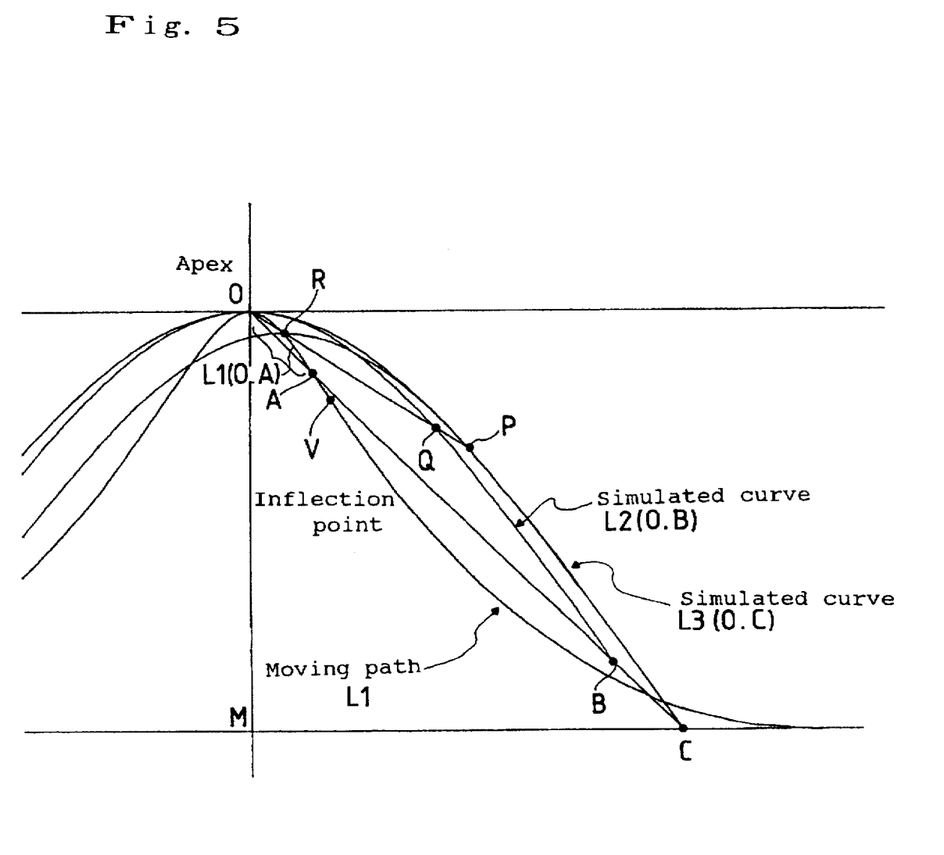
FIG. 5 is a diagram for explaining the method of tooth profile derivation of this invention.

FIG. 5 is a diagram for explaining the method of tooth profile derivation of this invention. Point 0 in this figure is the apex of the moving path L1 of a tooth of the first gear (the point of maximum entry into a tooth space of the second gear) and point V is the inflection point at which the moving path L1 changes from convex to concave with respect to the second gear. A point A is defined in the OV segment of the moving path L1. Taking point O as the origin (center of similarity), the curve L1(O,A) between points O and A on the moving path L1 is similarity transformed at an enlargement ratio of $\lambda$ to obtain a simulated curve L2(O,B). This curve is adopted as the working tooth profile of the first gear. Although not shown in the figure, this curve is further smoothly connected with a fillet curve. The working tooth profile of the first gear is therefore a convex tooth profile.

Again taking point O as the origin (center of similarity), the curve L1(O,A) is next similarity transformed at an enlargement ratio of $(\lambda+1)$ to obtain a simulated curve L3(O,C). This curve is adopted as the basic tooth profile of the second gear. It is therefore a concave tooth profile.

The value of $\lambda$ is selected so that the distance of point C from point O in the addendum direction (vertical direction in the figure) becomes the same as or close to the amplitude OM of the path L1 in the addendum direction. In other words, by selecting point C in this manner, $\lambda$ can be defined with respect to the earlier selected point A as $$\lambda = (OC/OA) - 1.$$

That the tooth profiles of the first and second gears with tooth profiles defined in the foregoing manner properly mesh is indicated as follows.

In FIG. 5, take an arbitrary point P on the concave tooth profile L3(O,C) of the second gear, draw straight line OP, and define the points of intersection of OP with the convex tooth profile L2(O,B) of the first gear and the moving path L1(O,A) as Q and R. In light of the process of tooth profile derivation, it holds that $$OP = (\lambda+1) \times OR$$

$$OQ = \lambda \times OR.$$

Therefore, $$QP = OP - OQ = OR.$$

From the nature of the simulation, moreover, the tangents to the curves at the three points P, Q and R are mutually parallel.

From these two facts it can be seen that the convex tooth profile L2(O,B) contacts the concave tooth profile L3(O,C) at point P when point Q of the convex tooth profile L2(O,B) is located at point P. Specifically, continuous meshing is ensured between the convex tooth profile L2(O,B) and the concave tooth profile L3(O,C). In addition, since the meshing starts from the point where point B contacts point C (at which time point O of the first gear tooth profile is located at point A) and ends with meshing at point O, it is so-called pass meshing.

Figure 6:
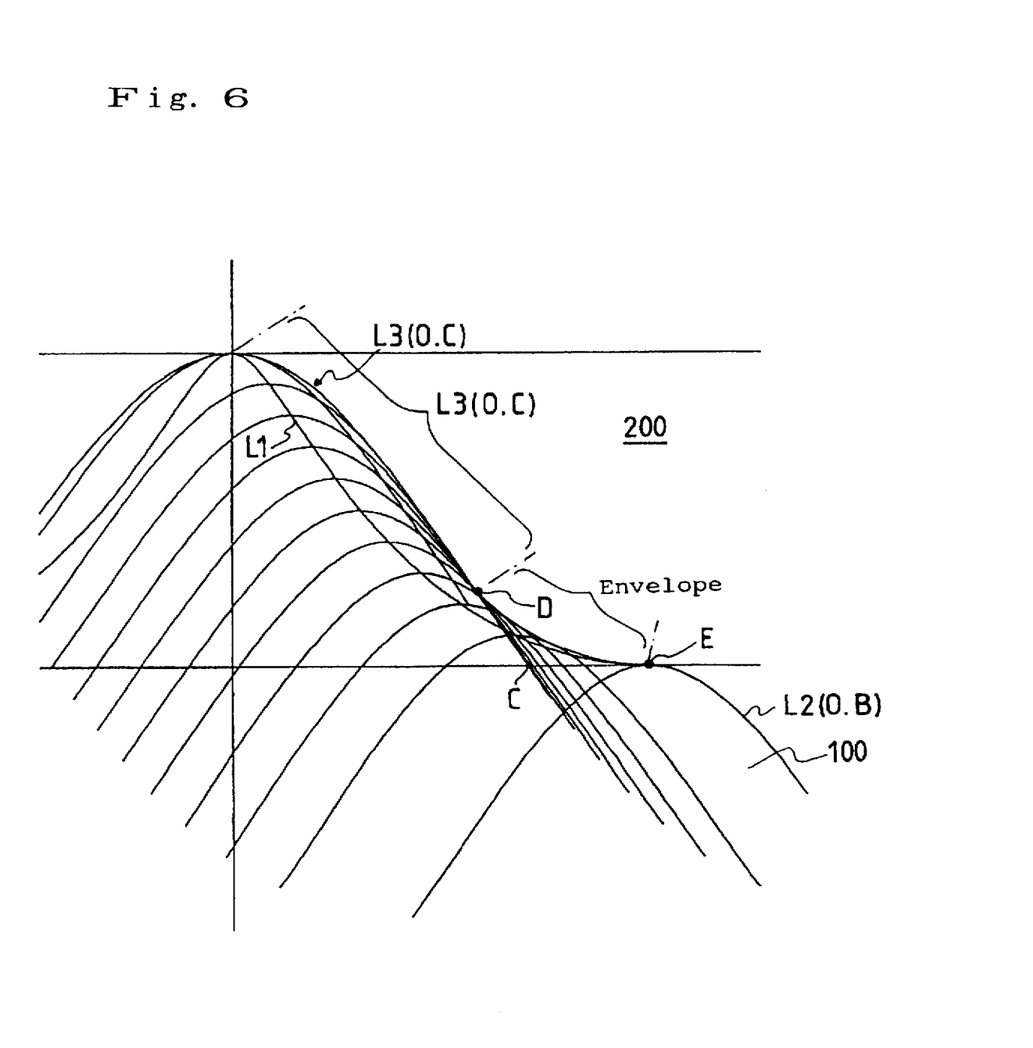
FIG. 6 is a diagram for explaining how the addendum portion of the concave curve of one gear is replaced by a convex envelope.

Actually, however, the generating action of the tooth profile of the first gear replaces the tooth crest portion of the second gear with a convex envelope before the meshing reaches point A on the moving path. The situation is shown in FIG. 6. The envelope is the DE portion in the figure. The meshing of this section is of passing type. In a flexible meshing type gear device equipped with a cup-shaped flexible external gear as shown in FIG. 3, moreover, the shape of the envelope changes depending on the location of the section perpendicular to the axis of the first gear and the penetration of the tooth crest into the second gear is greatest at the inner end portion (the portion designated 3c in FIG. 3(a)).

Figure 7:
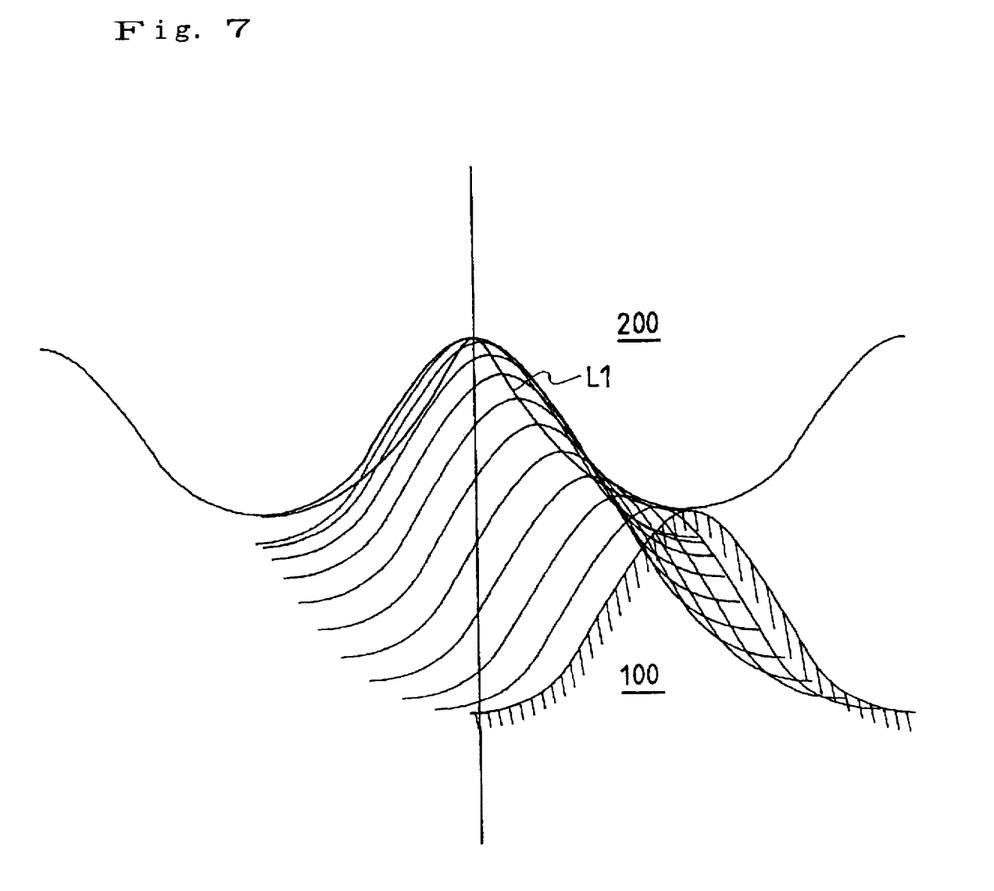
FIG. 7 is an explanatory diagram of the meshing of the tooth profiles of this invention in a basic section perpendicular to the tooth, drawn relatively with respect to one tooth space of one gear followed over the passage of time.

FIG. 7 depicts the meshing of the tooth profiles of this invention in a basic section perpendicular to the tooth, relatively with respect to one tooth space of the second gear followed over the passage of time.

Figure 8:
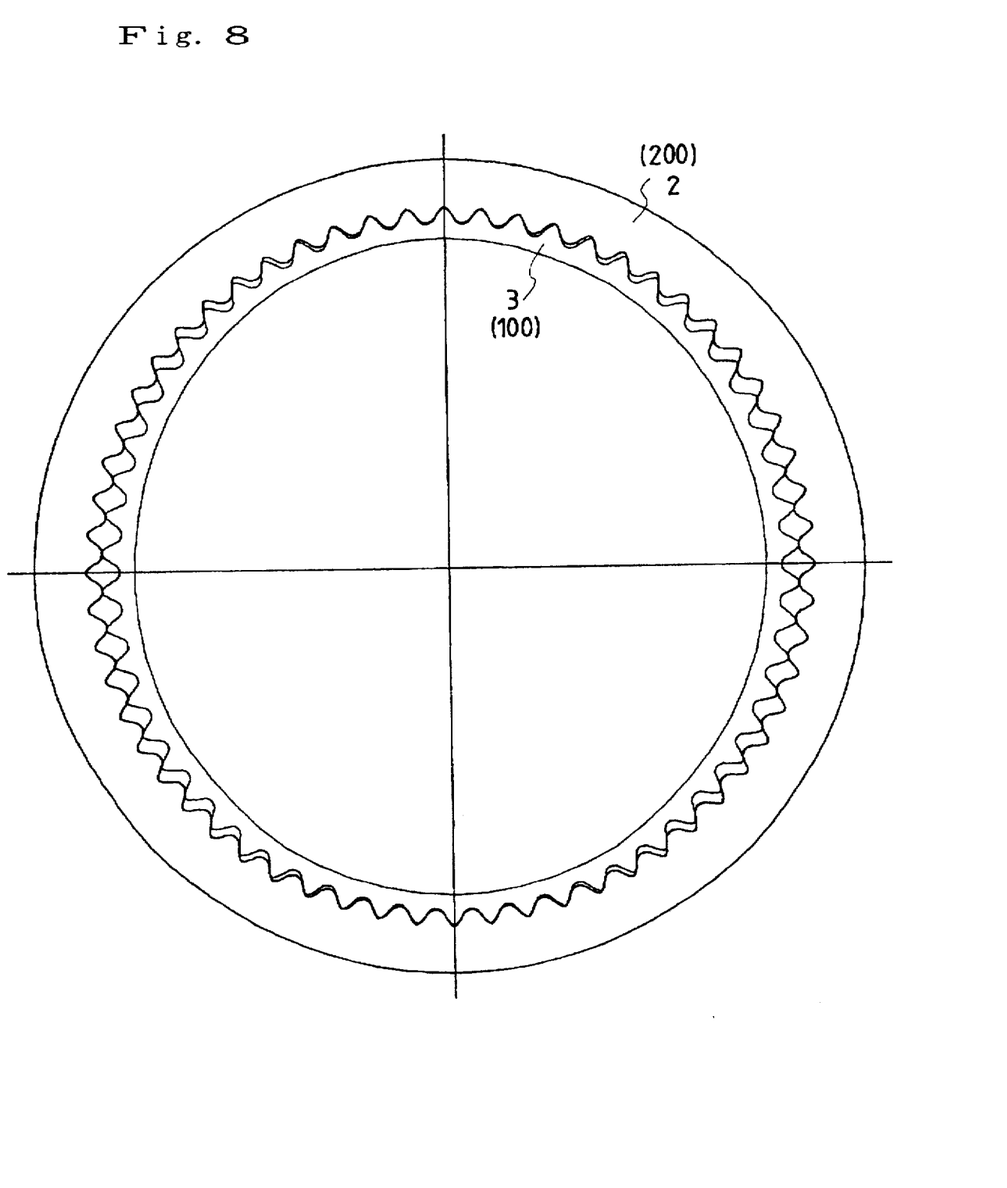
FIG. 8 is an explanatory diagram of the meshing of the tooth profiles of this invention in a basic section perpendicular to the teeth, the diagram relating to the case where the tooth profile of the main portion of the flexible external gear is convex and the tooth profile of the main portion of the rigid internal gear is concave and being drawn spatially over all teeth of the rigid internal gear.
Figure 9:
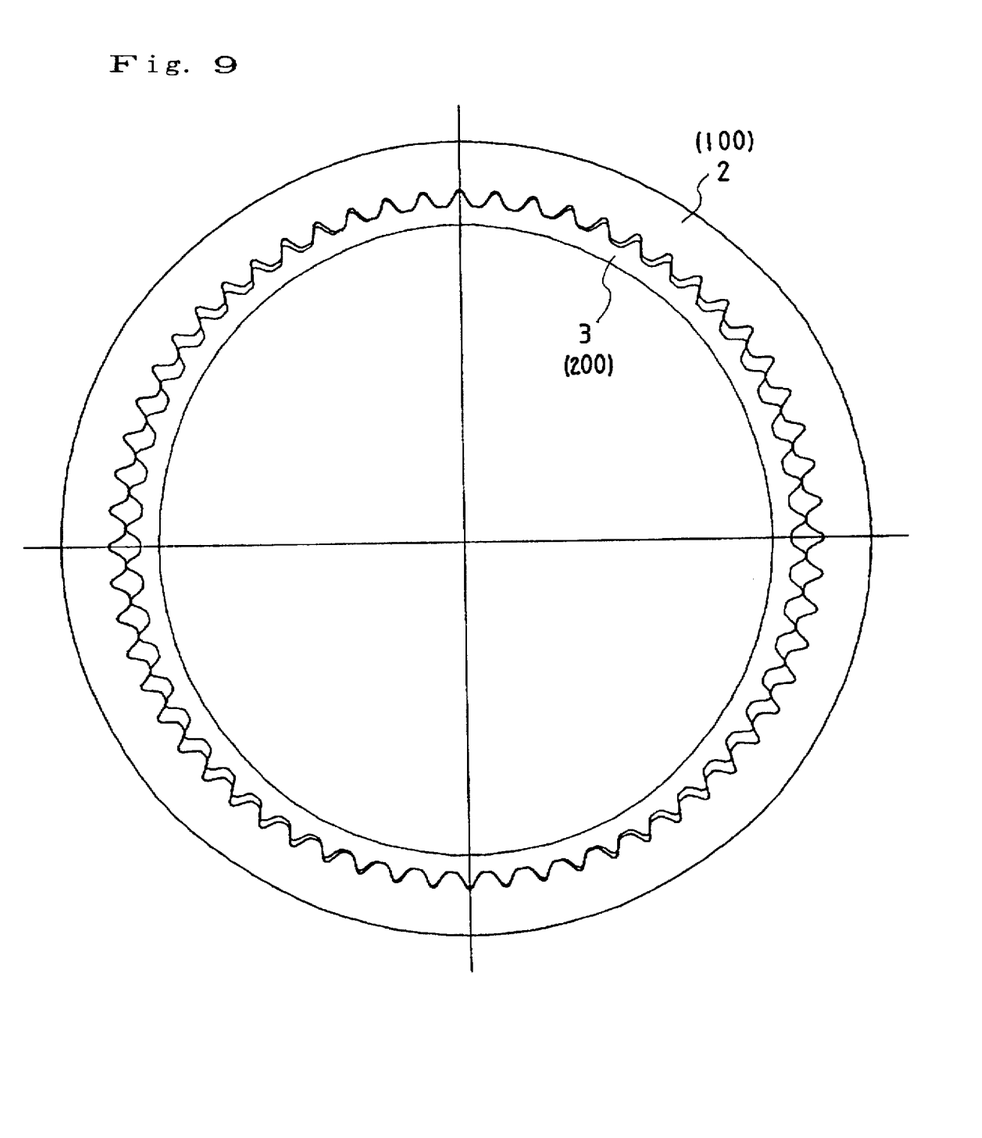
FIG. 9 is a spatially drawn explanatory diagram of the meshing of the tooth profiles in the case where the convexity and concavity of the main portions of the two gears is reversed from than in FIG. 8.

FIG. 8 is a spatial representation over all of the teeth, in which the first gear 100 is the flexible external gear 3 and the second gear 200 is the rigid internal gear 2. In contrast, FIG. 9 is a representation in which the first gear 100 is the rigid internal gear 2 and the second gear 200 is the flexible external gear 3.

As pointed out earlier, in a device equipped with a cup-shaped flexible external gear, the shape of the curve with which the tooth crest of the first gear 100 envelops the second gear 200 depends on the location of the section perpendicular to the axis of the first gear (see FIG. 6). In this case, the meshing rigidity can be enhanced by defining the convex tooth profile of the addendum portion of the second gear 200 as the envelope at the inner end portion 3c. It is also possible to impart some degree of relief to the envelope in order to accentuate wear resistance, or simply to shorten the tooth crest to obtain full pass meshing, which is advantageous from the point of lubrication.

Figure 10A:
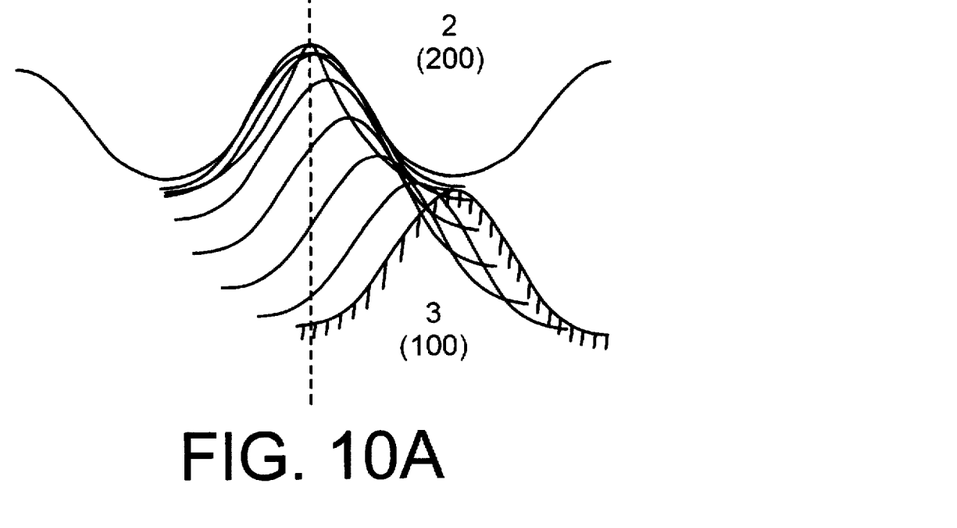
FIG. 10 is a set of diagrams for explaining an example of meshing interference of the tooth profiles of this invention in sections other than the basic section perpendicular to the tooth, in which (a) is for a section on the opening side of the basic section perpendicular to the tooth and (b) is for a section on the diaphragm side of the basic section perpendicular to the tooth.
Figure 10B:
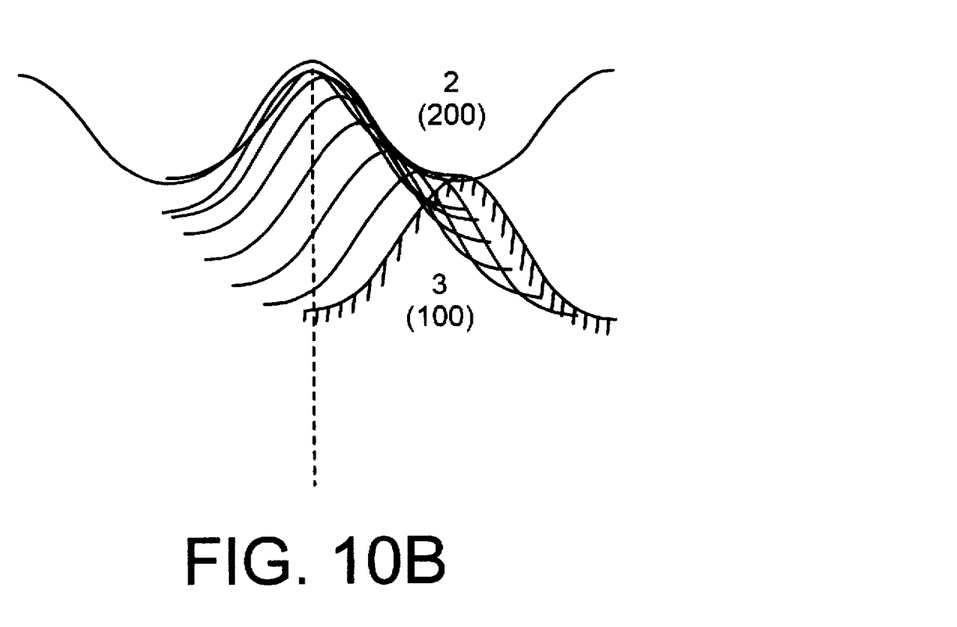

The nature of the tooth profile with respect to coning of the flexible external gear of a flexible meshing type gear device equipped with a cup-shaped flexible external gear as shown in FIG. 3 will now be considered. The tooth profile of this invention is derived from the moving path in a basic section and cannot be applied without modification to other sections. FIG. 10 shows this taking as an example the case where the first gear 100 is the flexible external gear 3 and the second gear 200 is the rigid internal gear 2. This figure is for the case where the basic section is taken at the center of the tooth trace (at the position of the line IV—IV in FIG. 3(a)). FIG. 10(a) is for a section on the opening side of the basic section and FIG. 10(b) is for a section at the inner end on the diaphragm side of the basic section.

Figure 11:
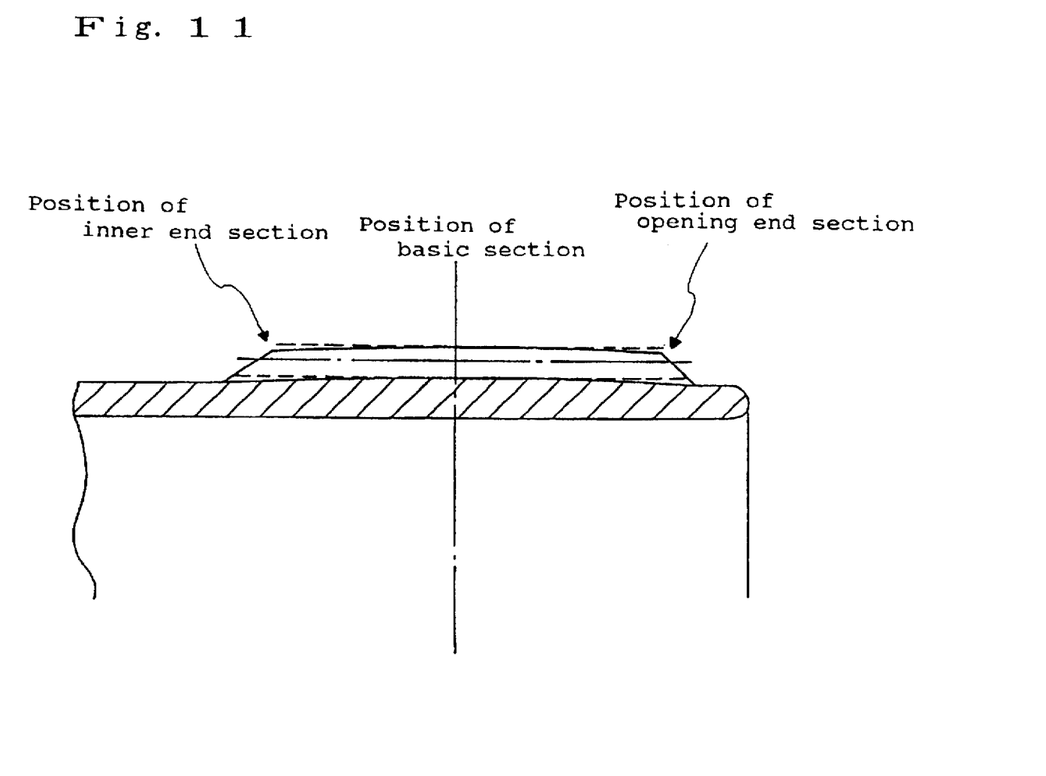
FIG. 11 is a diagram for explaining relieving of a flexible external gear tooth.

As can be seen from these figures, the teeth interfere in sections toward either side from the basic section. One method for avoiding this is, as shown in FIG. 11, to apply opposite sides of the tooth from the basic section with an amount of relieving matched to the amount of interference.

Figure 12A:
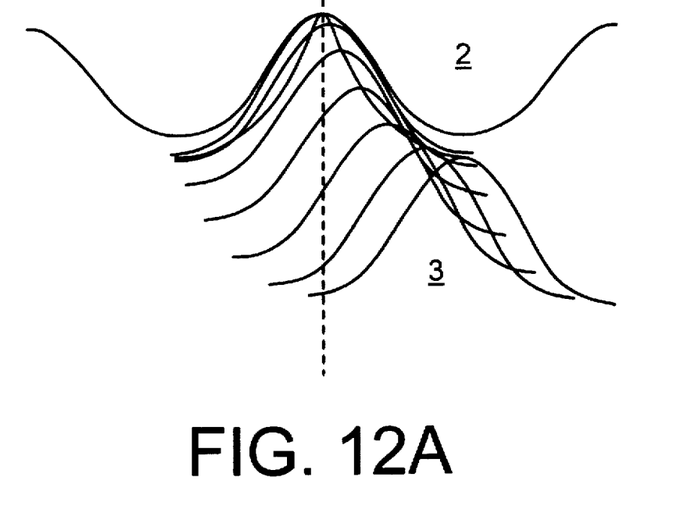
FIG. 12 is a set of explanatory diagrams showing an example of meshing of the tooth profiles of this invention in relieved sections other than the basic section perpendicular to the tooth, in which (a) is for a section on the opening side of the basic section perpendicular to the tooth and (b) is for a section on the diaphragm side of the basic section perpendicular to the tooth.
Figure 12B:
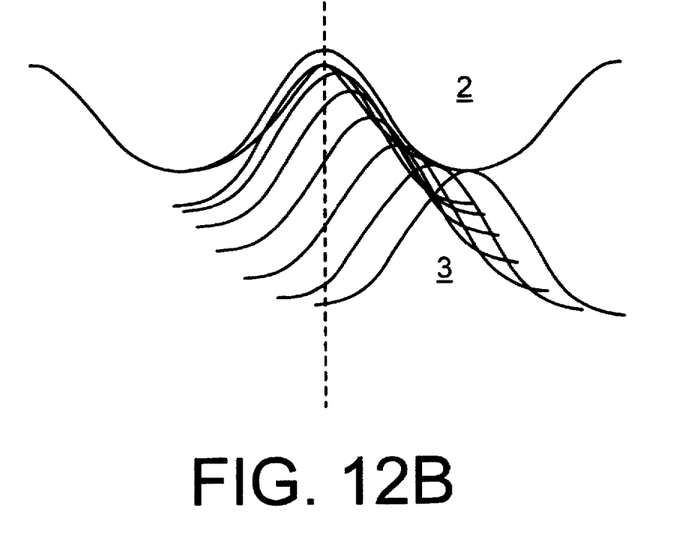

FIGS. 12(a), (b) show meshing of the tooth profiles in a section on the opening side and in a section at the inner end when relieving is applied. Another method for achieving continuous contact along the tooth trace is to appropriately correct the tooth profile of the flexible external gear without relieving.

Figure 13A:
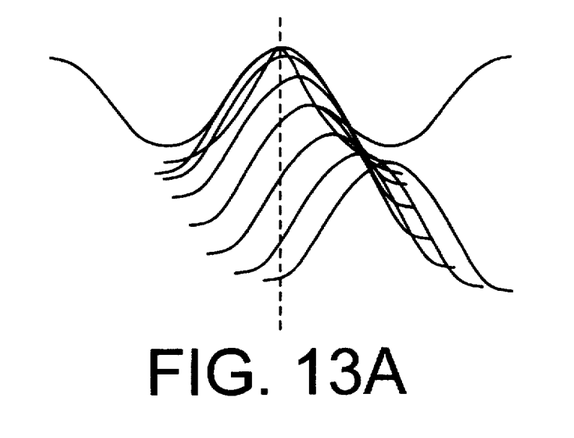
FIG. 13 is a set of explanatory diagrams showing meshing in different unrelieved sections in the case where the tooth profile of the cup-shaped flexible external gear is corrected, in which (a) is for a section at the opening portion, (b) is for the basic section and (c) is for a section at the inner end portion.
Figure 13B:
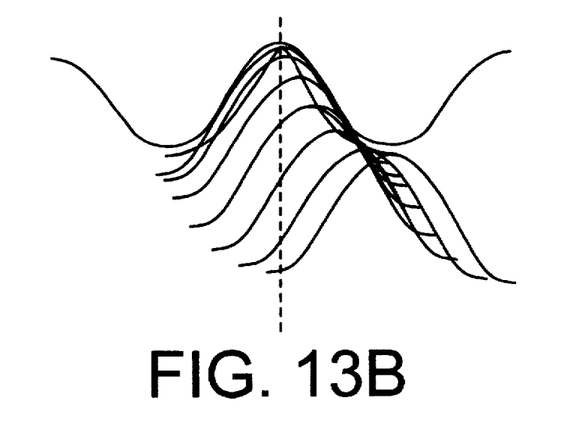
Figure 13C:
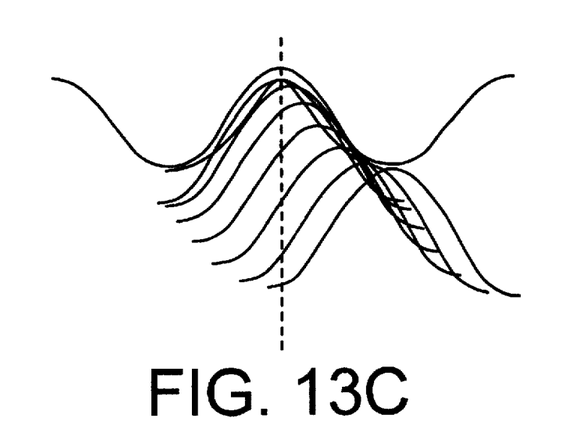

Meshing in this case is shown in FIG. 13, wherein (a) is for a section at the opening portion, (b) for the basic section and (c) for a section at the inner end.

Figure 14:
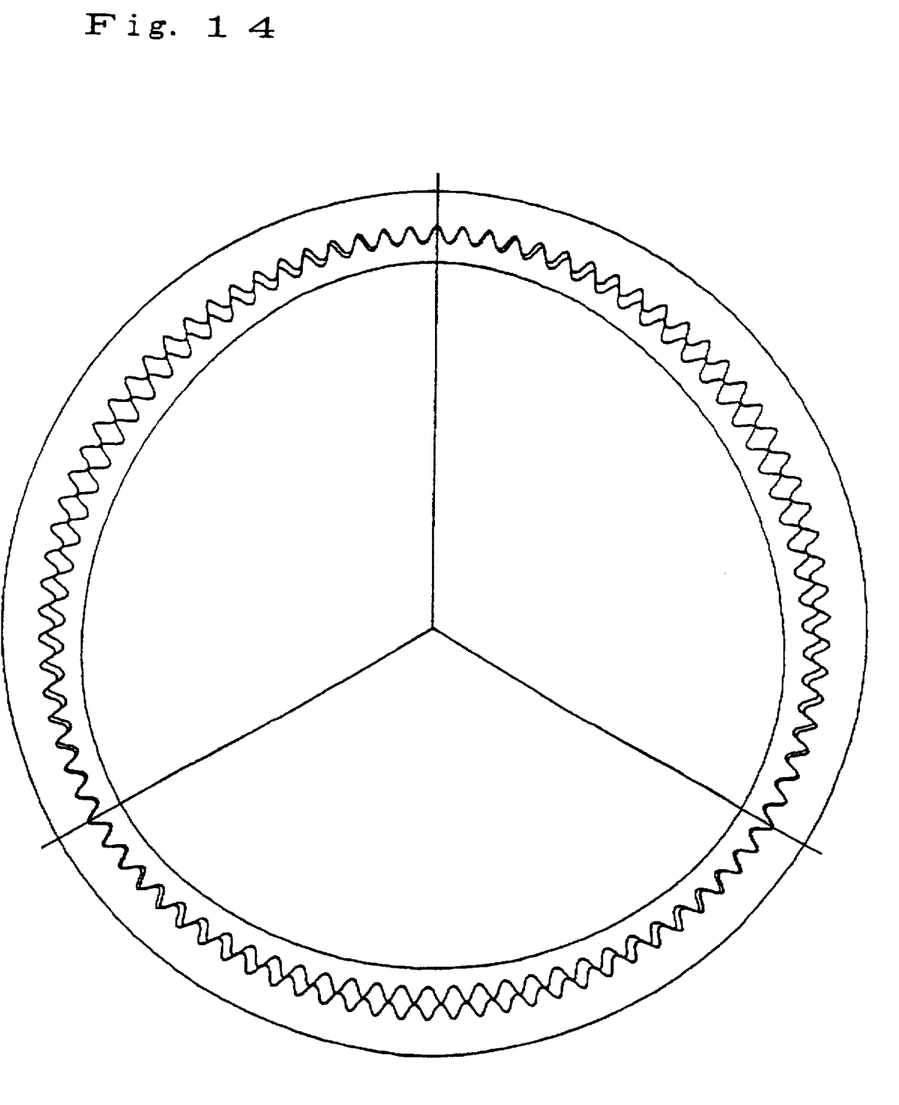
FIG. 14 is an explanatory diagram of the meshing of the tooth profiles of this invention in a basic section perpendicular to the teeth, the diagram relating to the case where the difference in number of teeth is 3 and being drawn spatially over all teeth.

Although the foregoing explanation was made mainly regarding the case of elliptical flexing, the method of the invention can be similarly applied in the case of trilobate flexing with a difference in number of teeth of 3n. FIG. 14 shows an example of the meshing in the basic sector in this case, spatially over all of the teeth.

Industrial Applicability

As set out in the foregoing, by introducing pass meshing the present invention makes it possible to greatly enhance the ability to retain a lubricating oil film between the tooth surfaces and to markedly improve the permissible transmitted torque of the flexible meshing type gear device based on tooth surface wear.

Moreover, the adoption of negative deviation reduces the bending stress produced by flexing in the vicinity of the major and minor axes of the flexible external gear, enhances the rim strength of the flexible external gear, and enables an improvement in meshing rigidity owing to continuous tooth contact.

In addition, since the invention can be implemented at an arbitrary coning angle of the cup-shaped flexible external gear, it can also be applied to a flexible external gear with a short body. It is further applicable to an annular flexible external gear with no coning.

I claim:

1. A flexible meshing type gear device with negative deflection passing tooth profile having a rigid internal gear, a flexible external gear inside the internal gear and a wave generator for flexing a section of the external gear perpendicular to its axis into an elliptical shape, causing the flexible external gear to mesh partially with the rigid internal gear and rotating mesh positions of the two gears in a circumferential direction, the rotation of the wave generator producing relative rotation between the two gears, characterized in being provided with the following structural features:

(a) an amount of radial flexing (w) in a basic section defined perpendicular to a flexible external gear axis at a prescribed point on a tooth trace of the gear is defined to be an amount of negative deviation flexing smaller than a normal amount of flexing ($W_o$), (b) the rigid internal gear and the flexible external gear are both spur gears, (c) a number of teeth of the flexible external gear is 2n (n being a positive integer) fewer than that of the rigid internal gear, (d) a working tooth profile of either one of the rigid internal gear or the flexible external gear, called a first gear, is defined to be a convex curve whose shape approximates a convex curve obtained by similarity transformation of a peak portion of a rack-approximated moving path of a tooth of the gear with respect to the other gear, called a second gear, in the basic section of the tooth trace perpendicular to the axis, the portion being convex relative to the second gear, at an enlargement ratio ($\lambda$) using an apex of the moving path as an origin, and (e) the working tooth profile of the second gear is defined to be a concave curve whose shape approximates a concave curve obtained by similarity transformation of the same portion of the moving path at an enlargement ratio ($\lambda+1$) using the apex of the moving path as the origin, whereby meshing of the tooth profiles of the first and second gears is pass messing enabling continuous contact in the basic sector perpendicular to the axis.

2. A flexible meshing type gear device with negative deflection passing tooth profile according to claim 1, wherein the peak portion of the concave tooth profile of the second gear whose working tooth profile is a concave curve is defined by a convex curve to avoid interference of the peak portion of the concave tooth profile with the convex first gear tooth profile defined from a convex curve.

3. A flexible meshing type gear device with negative deflection passing tooth profile according to claim 1, wherein a tooth crest of the second gear, whose working tooth profile is a concave curve, is shortened to avoid interference of the tooth crest of the concave tooth profile with the convex first gear tooth profile defined from a convex curve.

4. A flexible meshing type gear device with negative deflection passing tooth profile having a rigid internal gear, a flexible external gear inside the internal gear and a wave generator for flexing a section of the external gear perpendicular to its axis into a trilobate shape, causing the flexible external gear to mesh partially with the rigid internal gear and rotating mesh positions of the two gears in a circumferential direction, the rotation of the wave generator producing relative rotation between the two gears, characterized in being provided with the following structural features:

(a) an amount of radial flexing (w) in a basic section defined perpendicular to a flexible external gear axis at a prescribed point on a tooth trace of the gear is defined to be an amount of negative deviation flexing smaller than a normal amount of flexing ($W_o$), (b) the rigid internal gear and the flexible external gear are both spur gears, (c) a number of teeth of the flexible external gear is 3n (n being a positive integer) fewer than that of the rigid internal gear, (d) a working tooth profile of either one of the rigid internal gear or the flexible external gear, called a first gear, is defined to be a convex curve whose shape approximates a convex curve obtained by similarity transformation of a peak portion of a rack-approximated moving path of a tooth of the gear with respect to the other, called a second gear, in the basic section of the tooth trace perpendicular to the axis, the portion being convex relative to the second gear, at an enlargement ratio ($\lambda$) using an apex of the moving path as an origin, and (e) the working tooth profile of the second gear is defined to be a concave curve whose shape approximates a concave curve obtained by similarity transformation of the same portion of the moving path at an enlargement ratio ($\lambda+1$) using the apex of the moving path as the origin, whereby meshing of the tooth profiles of the first and second gears is pass messing enabling continuous contact in the basic sector perpendicular to the axis.

5. A flexible meshing type gear device with negative deflection passing tooth profile according to claim 4, wherein the peak portion of the concave tooth profile of the second gear whose working tooth profile is a concave curve is defined by a convex curve to avoid interference of the peak portion of the concave tooth profile with the convex first gear tooth profile defined from a convex curve.

6. A flexible meshing type gear device with negative deflection passing tooth profile according to claim 4, wherein a tooth crest of the second gear, whose working tooth profile is a concave curve, is shortened to avoid interference of the tooth crest of the concave tooth profile with the convex first gear tooth profile defined from a convex curve.

7. A flexible meshing type gear device with negative deflection passing tooth profile having a rigid internal gear, a cup-shaped flexible external gear inside the internal gear and a wave generator for flexing the external gear into an elliptical shape in a section perpendicular to its axis such that an amount of flexing is produced from a diaphragm end to an opening end thereof in approximate proportion to distance from the diaphragm, causing the external gear to mesh partially with the rigid internal gear and rotating mesh positions of the two gears in a circumferential direction, the rotation of the wave generator producing relative rotation between the two gears, characterized in being provided with the following structural features:

(a) an amount of radial flexing (w) in a basic section defined perpendicular to a flexible external gear axis at a prescribed point on a tooth trace of the gear is defined to be an amount of negative deviation flexing smaller than a normal amount of flexing ($W_o$), (b) the rigid internal gear and the flexible external gear are both spur gears, (c) a number of teeth of the flexible external gear is 2n (n being a positive integer) fewer than that of the rigid internal gear, (d) a working tooth profile of either one of the rigid internal gear or the flexible external gear, called a first gear, is defined to be a convex curve whose shape is or approximates a convex curve obtained by similarity transformation of a peak portion of a rack-approximated moving path of a tooth of the gear with respect to the other gear, called a second gear, in the basic section of the tooth trace perpendicular to the axis, the portion being convex relative to the second gear, at an enlargement ratio ($\lambda$) using an apex of the moving path as an origin, and (e) the working tooth profile of the second gear is defined to be a concave curve whose shape approximates a concave curve obtained by similarity transformation of the same portion of the moving path at an enlargement ratio ($\lambda+1$) using the apex of the moving path as the origin, whereby meshing of the tooth profiles of the first and second gears is pass messing enabling continuous contact in the basic sector perpendicular to the axis.

8. A flexible meshing type gear device with negative deflection passing tooth profile according to claim 7, wherein the peak portion of the concave tooth profile of the gear whose working tooth profile is a concave curve is defined by a convex curve to avoid interference of the peak portion of the concave tooth profile with the convex tooth profile defined from a convex curve.

9. A flexible meshing type gear device with negative deflection passing tooth profile according to claim 7, wherein a tooth crest of the second gear, whose working tooth profile is a concave curve, is shortened to avoid interference of the tooth crest of the concave tooth profile with the convex first gear tooth profile defined from a convex curve.

10. A flexible meshing type gear device with negative deflection passing tooth profile according to claim 8, wherein the gear profile of at least one of the first and second gears is applied with relieving toward the opening portion of the cup-shaped flexible external gear and toward the inner end on a diaphragm side thereof relative to the basic section of the tooth trace perpendicular to the axis, to avoid interference between the two tooth profiles owing to coning of the cup-shaped flexible external gear.

11. A flexible meshing type gear device with negative deflection passing tooth profile having a rigid internal gear, a cup-shaped flexible external gear inside the internal gear and a wave generator for flexing the external gear into a trilobate shape in a section perpendicular to its axis such that an amount of flexing is produced from a diaphragm end to an opening end thereof in approximate proportion to distance from the diaphragm, causing the external gear to mesh partially with the rigid internal gear and rotating mesh positions of the two gears in a circumferential direction, the rotation of the wave generator producing relative rotation between the two gears, characterized in being provided with the following structural features:

(a) an amount of radial flexing (w) in a basic section defined perpendicular to a flexible external gear axis at a prescribed point on a tooth trace of the gear is defined to be an amount of negative deviation flexing smaller than a normal amount of flexing ($W_o$), (b) the rigid internal gear and the flexible external gear are both spur gears, (c) a number of teeth of the flexible external gear is 3n (n being a positive integer) fewer than that of the rigid internal gear, (d) a working tooth profile of either one of the rigid internal gear or the flexible external gear, called a first gear, is defined to be a convex curve whose shape approximates a convex curve obtained by similarity transformation of a peak portion of a rack-approximated moving path of a tooth of the gear with respect to the other gear, called a second gear, in the basic section of the tooth trace perpendicular to the axis, the portion being convex relative to the second gear, at an enlargement ratio ($\lambda$) using an apex of the moving path as an origin, and (e) the working tooth profile of the second gear is defined to be a concave curve whose shape approximates a concave curve obtained by similarity transformation of the same portion of the moving path at an enlargement ratio ($\lambda+1$) using the apex of the moving path as the origin, whereby meshing of the tooth profiles of the first and second gears is pass messing enabling continuous contact in the basic sector perpendicular to the axis.

12. A flexible meshing type gear device with negative deflection passing tooth profile according to claim 11, wherein the peak portion of the concave tooth profile of the second gear whose working tooth profile is a concave curve is defined by a convex curve to avoid interference of the peak portion of the concave tooth profile with the convex first gear tooth profile defined from a convex curve.

13. A flexible meshing type gear device with negative deflection passing tooth profile according to claim 11, wherein a tooth crest of the first gear, whose working tooth profile is a concave curve, is shortened to avoid interference of the tooth crest of the concave tooth profile with the convex first gear tooth profile defined from a convex curve.

14. A flexible meshing type gear device with negative deflection passing tooth profile according to claim 12, wherein the gear profile of at least one of the first and second gears is applied with relieving toward the opening portion of the cup-shaped flexible external gear and toward the inner end on a diaphragm side thereof relative to the basic section of the tooth trace perpendicular to the axis, to avoid interference between the two tooth profiles owing to coning of the cup-shaped flexible external gear.

\* \* \* \* \*